(12) United States Patent
Kalam

(10) Patent No.: US 12,137,278 B2
(45) Date of Patent: Nov. 5, 2024

(54) CUSTOMIZED CONTENT DELIVERY

(71) Applicant: DISH Network Technologies India Private Limited, Bengaluru Karnataka (IN)

(72) Inventor: Arun Pulasseri Kalam, Karnataka (IN)

(73) Assignee: DISH Network Technologies India Private Limited, Karnataka (IN)

( * ) Notice: Subject to any disclaimer, the term of this patent is extended or adjusted under 35 U.S.C. 154(b) by 30 days.

(21) Appl. No.: 17/863,548

(22) Filed: Jul. 13, 2022

(65) Prior Publication Data
US 2023/0370692 A1    Nov. 16, 2023

(30) Foreign Application Priority Data
May 14, 2022   (IN) .............................. 202241027838

(51) Int. Cl.
*H04N 21/81*     (2011.01)
*H04N 21/442*    (2011.01)
*H04N 21/466*    (2011.01)

(52) U.S. Cl.
CPC ..... *H04N 21/812* (2013.01); *H04N 21/44218* (2013.01); *H04N 21/4665* (2013.01); *H04N 21/4667* (2013.01)

(58) Field of Classification Search
CPC .......... H04N 21/812; H04N 21/44218; H04N 21/4665; H04N 21/4667; H04N 21/4826; H04N 21/4668; H04N 21/4532; H04N 21/25891

USPC .......................................................... 725/14
See application file for complete search history.

(56) References Cited

U.S. PATENT DOCUMENTS

| | | | |
|---|---|---|---|
| 9,263,084 B1 * | 2/2016 | Amacker | H04N 21/44218 |
| 2011/0007079 A1 * | 1/2011 | Perez | A63F 13/56 345/473 |
| 2012/0072936 A1 * | 3/2012 | Small | G06Q 30/00 725/10 |
| 2012/0124604 A1 * | 5/2012 | Small | H04N 21/4223 725/12 |
| 2012/0179642 A1 * | 7/2012 | Sweeney | G06F 16/3334 706/55 |
| 2013/0243270 A1 * | 9/2013 | Kamhi | H04N 21/458 382/118 |
| 2014/0026156 A1 * | 1/2014 | Deephanphongs | H04N 21/251 725/12 |
| 2014/0068692 A1 * | 3/2014 | Archibong | H04N 21/6334 725/116 |
| 2014/0245335 A1 * | 8/2014 | Holden | H04N 21/44218 725/12 |
| 2014/0270683 A1 * | 9/2014 | Zhu | G06F 16/436 386/224 |

(Continued)

*Primary Examiner* — Cynthia M Fogg
(74) *Attorney, Agent, or Firm* — Kilpatrick Townsend & Stockton LLP

(57) ABSTRACT

Imaging devices may capture images of a user premises. The images may be analyzed and processed by a television receiver to determine a scene associated with the user premises. Information indicative of the scene may be transmitted to a service provider system. A content item is received by the television receiver from the service provider system, where the content item is determined based on the information indicative of the scene. The television receiver outputs the content item for presentation to a user device.

20 Claims, 5 Drawing Sheets

(56) References Cited

U.S. PATENT DOCUMENTS

| | | | |
|---|---|---|---|
| 2015/0142606 A1* | 5/2015 | Hafeez | G06Q 30/0625 |
| | | | 705/26.62 |
| 2016/0379047 A1* | 12/2016 | Natan | G06V 40/171 |
| | | | 382/201 |
| 2017/0289606 A1* | 10/2017 | Tumanov | H04N 21/2668 |
| 2018/0205990 A1* | 7/2018 | Matthews | G06F 16/2379 |
| 2018/0324491 A1* | 11/2018 | Anderson | H04L 9/3231 |
| 2021/0029391 A1* | 1/2021 | Choudhari | H04N 21/6582 |
| 2022/0066537 A1* | 3/2022 | Govindgari | G06Q 30/08 |
| 2022/0172426 A1* | 6/2022 | Lissi | A63F 13/67 |
| 2022/0210510 A1* | 6/2022 | Richter | H04N 21/4126 |
| 2022/0377413 A1* | 11/2022 | Lidaka | H04N 21/4756 |
| 2023/0368327 A1* | 11/2023 | Nattinger | A61B 5/1123 |

\* cited by examiner

CUSTOMIZED CONTENT DELIVERY

CROSS-REFERENCE TO RELATED APPLICATIONS

This application claims priority to Indian Provisional Patent Application No. 202241027838, filed on May 14, 2022, entitled "Customized Content Delivery," the disclosure of which is hereby incorporated by reference in its entirety for all purposes.

BACKGROUND

Content is often tailored to particular types of consumers or consumer groups. Consumers may be grouped based on demographic data such as age, income, television viewing preferences, or education. In other words, content is delivered to a consumer based on a consumer's profile that includes interests of the consumer. While targeting content to a specific consumer, it is assumed that the consumer's interests do not change. As such, it is difficult to assess if the content delivered to the consumer has had an effect, or if assumptions based on the grouping of the consumer are accurate for each individual consumer. Embodiments described herein address these issues both collectively and individually.

SUMMARY

Described herein are systems, methods, devices, and computer-program products for targeting content for output by a receiver (e.g., a television receiver). The content to be output by the television receiver is determined based on a scene (e.g., a situation) corresponding to a user premises. For example, the method for targeting content to be output by the television receiver may include activating, by the television receiver, an imaging device disposed in a user premises. The activating directs the imaging device to capture one or more images of an area of the user premises. The television receiver processes the one or more images to determine a scene associated with the user premises. Information indicative of the scene is transmitted by the television receiver to a service provider system. The television receiver obtains a content item from the service provider system, where the content item is selected based on the information indicative of the scene. Upon receiving the content item, the television receiver outputs the content item for presentation to a user device.

An aspect of the present disclosure provides for a computer-program product tangibly embodied in a non-transitory machine-readable media, having machine-readable instructions thereon configured to cause one or more data processors to perform part or all of one or more methods disclosed herein.

An aspect of the present disclosure provides for a television receiver including a processor and a memory including instructions that, when executed by the processor, cause the television receiver to perform part or all of one or more methods disclosed herein.

The foregoing, together with other features and embodiments will become more apparent upon referring to the following specification, claims, and accompanying drawings.

DETAILED DESCRIPTION

Figure 1:
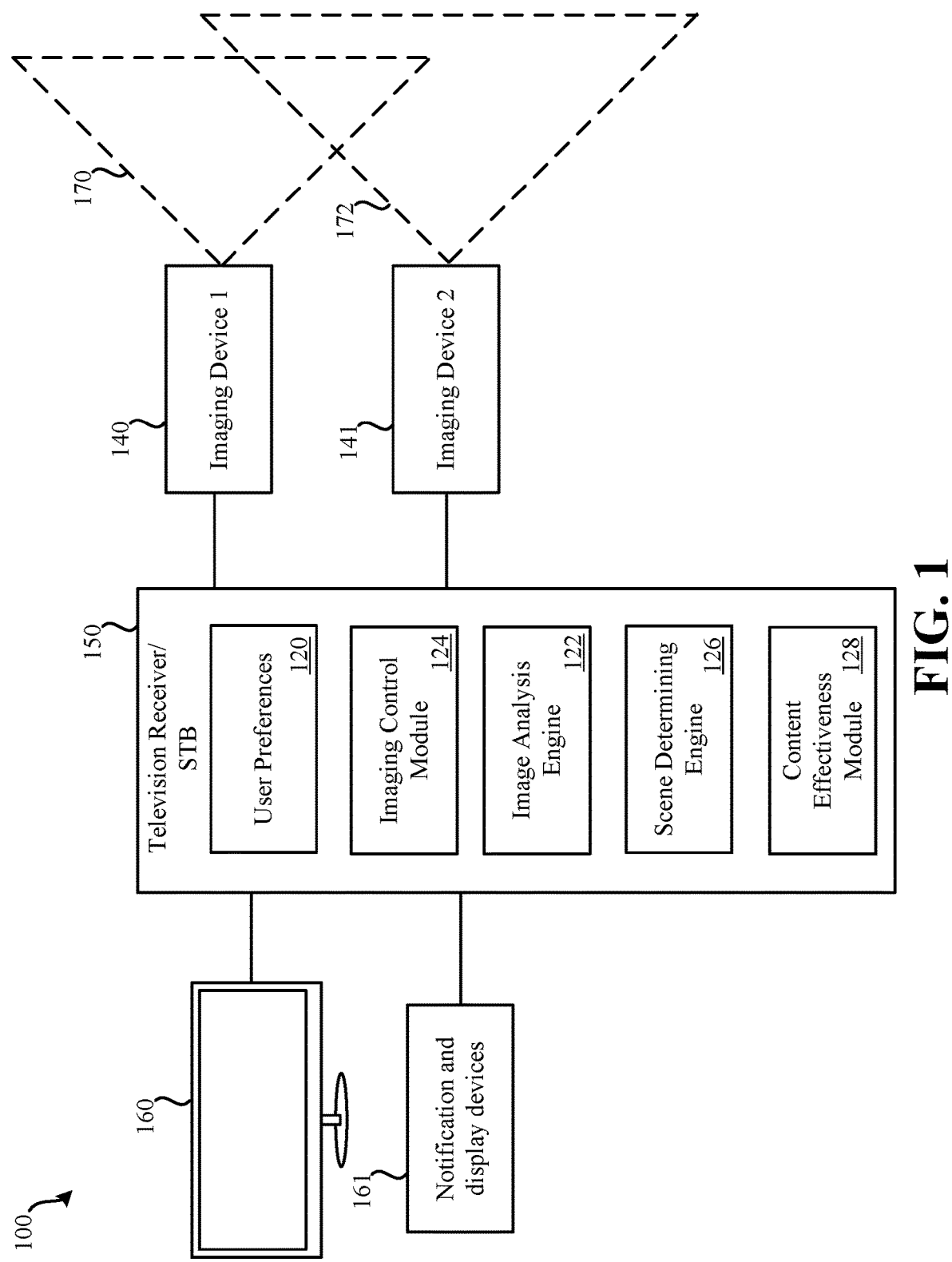
FIG. 1 illustrates an embodiment of a system for determining a scene in a user premises.

Imaging devices may be used to image an area of or within a home. Images captured by an imaging device may be analyzed or processed to identify one or more entities in the area (e.g., a user premises). Images may be analyzed to identify people, products, brands of products, product barcodes, brand names, trademarks, shapes or specific products, and the like. The images may be analyzed to determine a scene (e.g., a situation or an activity being performed in the user premises) associated with the captured image(s).

The imaging device may be coupled to a television set-top-box (STB) or a computer. A STB, for example, may receive captured images and analyze the images to identify a scene. Information about the scene may be used to tailor content presented to the user. Content, such as television advertisements, advertisement banners displayed on the television, or other content may be tailored based on the scene. Content may be complimentary to products that a user already has in the home. For example, if a user already has products of a specific brand, content that educates the user about new products of the brand may be selected and presented to the user. In another example, if a user already had products of a specific brand, content may include advertisements for competing brands.

Imaging devices may include cameras that capture digital photos of an area. The images may be analyzed using image recognition algorithms. Imaging devices may include depth cameras, sonar devices, scanning lasers, and/or the like which may be used to get a three dimensional image of an area. The three dimensional image may be analyzed to identify specific shapes of containers for products or other items. Imaging devices may also include any number of infrared cameras, scanning cameras, and the like. An imaging device may include more than one camera, depth camera, scanning laser, and the like. Sensor data from multiple cameras and sensors may be analyzed in parallel or combined for analysis.

Imaging devices may be positioned near or may be integrated into a television, STB, computer, or other devices. The imaging device may be configured to image an area of a user's home. An imaging device positioned on a television, for example, may image a living room area of a home. In some cases, a television may be located in a kitchen or a bedroom of a home which may allow the imaging device to capture images of the kitchen or bedroom.

Imaging device, types of images captured by the imaging device, the analysis performed on the captured images may be configurable by a user. In some examples, settings may allow a user to configure the field of view of the imaging device. Users may limit the field of view of the imaging device or mark areas of a home or areas of the field of view of an imaging device that should not be analyzed (e.g., a portion of the area defined as off-limits for the imaging device). In one embodiment, images captured by the imaging device may be displayed on the television or other display device communicatively coupled to the imaging device. A user may outline areas of the image that should not be analyzed or used to identify items. A user may utilize a pointing device, such as a computer mouse, touch panel, and the like, to draw an outline around an area in the captured image that is off-limits for analysis. A user may specify the times of day, week, or year the imaging device may capture images.

In some examples, the processing of captured images from the imaging device may be performed locally on the user's computer, STB, or other device. The captured images may be input to a machine-learning model (e.g., neural network model) that is trained to perform a classification that indicates a scene based on one or more entities detected in the one or more images, an activity performed by one or more entities in the area of the user premises, or both. Information indicative of the scene may be transmitted by the STB or television receiver to a backend service provider system. The service provider system in turn may identify one or more content items to be transmitted to the television receiver to be output for presentation on a user device (e.g., a television). It is appreciated that the one or more content items may correspond to customized advertisements, such as TV commercials, banner ads, and the like that may be displayed on a television.

In some examples, the television receiver may be configured to determine an effectiveness of the content item presented to the user. For instance, by one example, the television receiver may be configured to detect any touch operation or a click operation performed by the user (via a remote control device) with respect to the content item being presented to the user. Alternatively or additionally, the television receiver may determine the effectiveness of a content item by calculating correlations between the content presented to the user and the items found in a user's home (e.g., captured in the one or more images). Effectiveness of content may be determined by comparing the expected response of a content on a user with the observed effect. Observed effect may be determined directly from the items detected in a user's home. If content was directed to specific products or brands, the presence of the products in the user premises may mean that the content was effective.

Information indicative of the effectiveness of the content items may be transmitted by the television receiver to the service provider system. The service provider system may maintain a list of historical scenes identified in the user's premises and a corresponding list of content items that were presented previously to the user. In doing so, the service provider system may assign an effectiveness score to each content item, where the score of the content item indicates a relevancy of the content item to the scene. Upon receiving feedback from the television receiver with regard to the effectiveness of the content items, the service provider system may update the effectiveness score associated with each content item. It is appreciated that the effectiveness score may take into account factors such as: (a) the time between the content item being presented to the user and the time until a related change in the content items in user's premises is observed, (b) a frequency or number of advertisements shown to the user, etc.

As will be described below in detail, embodiments of the present disclosure provide customized content to a user, where the content is determined based on a scene corresponding to the user's premises. In doing so, embodiments of the present disclosure do not rely solely on a user's profile (e.g., persona), for presenting content items, but rather provide for an effective mechanism for delivering customized content based on an identified scene. Such mechanisms are more likely to increase a hit rate (e.g., a conversion rate) of the content items.

FIG. 1 shows an embodiment of a system for determining a scene in a user premises. The system 100 includes a STB or a television receiver 150. The system 100 may include a television receiver that is directly or indirectly coupled to a display device 160, such as a television or a monitor. The television receiver may be communicatively coupled to other notification and display devices 161, such as mobile phones, tablets, and the like. The television receiver may be configured to receive readings from one or more imaging devices 140 and 141. The imaging devices 140 and 141 may be wired to the television receiver 150. In some cases, the imaging devices may connect wirelessly to the television receiver 150 via one or more wireless protocols and technologies which may include, for example, WiFi, Bluetooth, ZigBee, and/or the like. Captured images from the imaging devices may be received via a wireless network or even from the cloud. Imaging devices may capture and upload images to the cloud. Imaging devices may be part of other devices, consoles, or home equipment. Cameras utilized in home security or gaming consoles may be utilized to capture images. The images may be received by the television receiver.

In examples, the television receiver may include an imaging control module 124. The imaging control module 124 may control the imaging devices 140 and 141. The imaging control module 124 may include protocols for communicating and interpreting image data from each of the imaging devices. The imaging control module 124 may control the timing of when the imaging devices are active. The imaging control module 124 may read user preferences 120 to determine restrictions on the activity of the imaging devices.

In examples, multiple imaging devices may image one area. The field of view 170 and 172 of each imaging device may be independent. In some cases, the field of view 170 and 172 of each imaging device may overlap. The overlap between the field of views may provide additional information. Each imaging device may provide for a different angle of view of an area of a home (e.g., a user premises). The imaging devices may be based on the same imaging technology. In some cases, multiple imaging devices configured to have the field of view of the same area of a home may be based on different imaging technologies. One imaging device may provide for infrared imaging, a second imaging device may provide depth information, while a third may provide color information.

The television receiver may include an image analysis engine 122. The image analysis engine 122 may receive captured images from the sensors and analyze the images to determine items, such as products, logos, trademarks, text, and the like. The image analysis engine 122 may read data from user preferences 120 to identify, if any, databases or lists of detectable items approved by the user. The databases of items may include templates of item definitions that may include shapes, logos, text, templates, and other information that may be used by the image analysis engine 122 to detect the items. The image analysis engine 122 may use a variety of image recognition algorithms for identifying items. Optical character recognition, shape analysis, border analysis, and the like may be used to identify items.

Various techniques may be used to improve the performance of item detection. In one example, the analysis engine may collect baseline or background images. Background or baseline images may be captured over time during different times of the day or week. Background images may be analyzed to identify all the items in the images. New captured images may be compared against background images to identify changes in the images. In one example, a difference between the background image and a new captured image may be taken. Differences in the background images and the new images may reveal areas that have changed or have new items. The image analysis engine 122 may be configured to focus on the areas of the captured images that have been identified to be different over the baseline or background images.

In examples, imaging devices may be configurable or adjustable. In some cases, the imaging devices may be configurable or adjustable for specific applications or user restrictions. In some cases, the imaging devices may be electronically adjustable from commands or instructions sent from the television receiver. For example, some parts of the images captured by the imaging device may be designated as restricted by the user. The television receiver may configure the imaging device to not image or black out the pixels that cover the area that is restricted by the user, preventing images of the restricted area from even leaving the imaging device.

During operation of the system 100, readings from the imaging device may be collected, stored, and/or analyzed in the television receiver 150. In examples, analysis of the captured images may be determined by user preferences 120 stored in the television receiver 150. The user preferences may define how the images are captured, how often, what periods of time, what resolution, and other characteristics. The user preferences may specify specific imaging device settings. The user preferences may define how the captured images are processed and/or analyzed. For example, for some applications, image analysis may include performing time based or historical analysis to determine trends in detected items.

In examples the television receiver or the imaging devices may be configured to provide results, status, analysis, and configuration data details to a user. An indication may be provided to the user each time an image is captured. Auditory, visual, and tactile communication methods may be used. Display devices, such as a television or a tablet, may be used to show information related to the imaging and analysis.

The television receiver 150 includes a scene determining engine 126. The scene determining engine 126 processes the one or more images captured by the imaging devices 140, 141 to identify a scene (also referred to herein as a 'situation') associated with a user premises. In one implementation, the scene determining engine 126 comprises a machine-learning model (e.g., a neural network model, a deep learning model) that is trained to perform a classification (e.g., identifies a scene) based on one or more items (e.g., entities) detected in the one or more images. For example, consider that a captured image includes a person operating a treadmill equipment (e.g., a fitness equipment). In such a case, the machine-learning model may identify the scene as an 'exercising' scene. In another example, if the captured image includes a plurality of entities (e.g., members of a family) that are sitting at a dining table, then the machine-learning model may identify the scene as a 'family' scene or a 'dining' scene. The machine-learning model is trained to assign a tag to the captured image(s) that identifies a scene associated with the image(s). Thus, by embodiments of the present disclosure, the scene determining engine 126, which includes the machine-learning model may be executed by the television receiver 150 to perform a classification that indicates the scene based on one or more entities detected in the one or more images, an activity performed (e.g., exercising) by one or more entities in the area of the user premises, or both.

By one embodiment, the television receiver 150 may transmit a message to a service provider system (described later with reference to FIG. 2). The message may include information indicative of the scene as determined by the scene determining engine 126. For instance, the information indicative of the scene may include the one or more entities captured in the image(s), a tag or label that corresponds to the scene, etc. As will be described next with reference to FIG. 2, the service provider system utilizes the information indicative of the scene to select one or more content items that are to be provided to the television receiver (e.g., the service provider system selects one or more content items to be provided to the television receiver based on the scene determined by the scene determining engine 126). The television receiver 150 may in turn, output the content item received from the service provider system for presentation on a user device or a display device.

The user devices, such as television, laptops, tablets, and the like, may be used for presenting to the user interfaces that may be used to further configure or change user preferences. An interface may include one or more options, selection tools, navigation tools for modifying the user preferences in turn may change activity of the imaging devices. Display interfaces may be used to select and/or download new item databases or definitions for detection. A catalog of pre-defined databases of items may be available to a user. A user may select, load, and/or install an item database on the television receiver by making a selection using in part the display device.

The television receiver 150 includes a content effectiveness module 128 that is programmed to determine an effectiveness of the content item that was output to the user device. Specifically, in one implementation, the content effectiveness module 128 is configured to detect whether a content item that was presented to a user was in fact of interest to the user. The content effectiveness module 128 may utilize sensors (e.g., touch sensors) associated with the user device that detect a touch or a click operation performed by a user (e.g., via a remote control device) with respect to the content item. It is appreciated that such interaction operations (touch or click operation) signify the user's interest in the content item. Additionally, the content effectiveness module 128 may communicate with the other notification and display devices 161 of the user to determine whether the user interacted with the content item using the other notification and display devices 161. For example, the content effectiveness module 128 may communicate with the other notification and display devices 161 to identify/determine whether the user purchased the content item using the other devices. Such information is collected by the content effectiveness module 128 and transmitted to the service provider system (described next with reference to FIG. 2), which uses the information to update/modify a score (that is indicative of a relevancy of the content item to the scene) associated with the content item.

Figure 2:
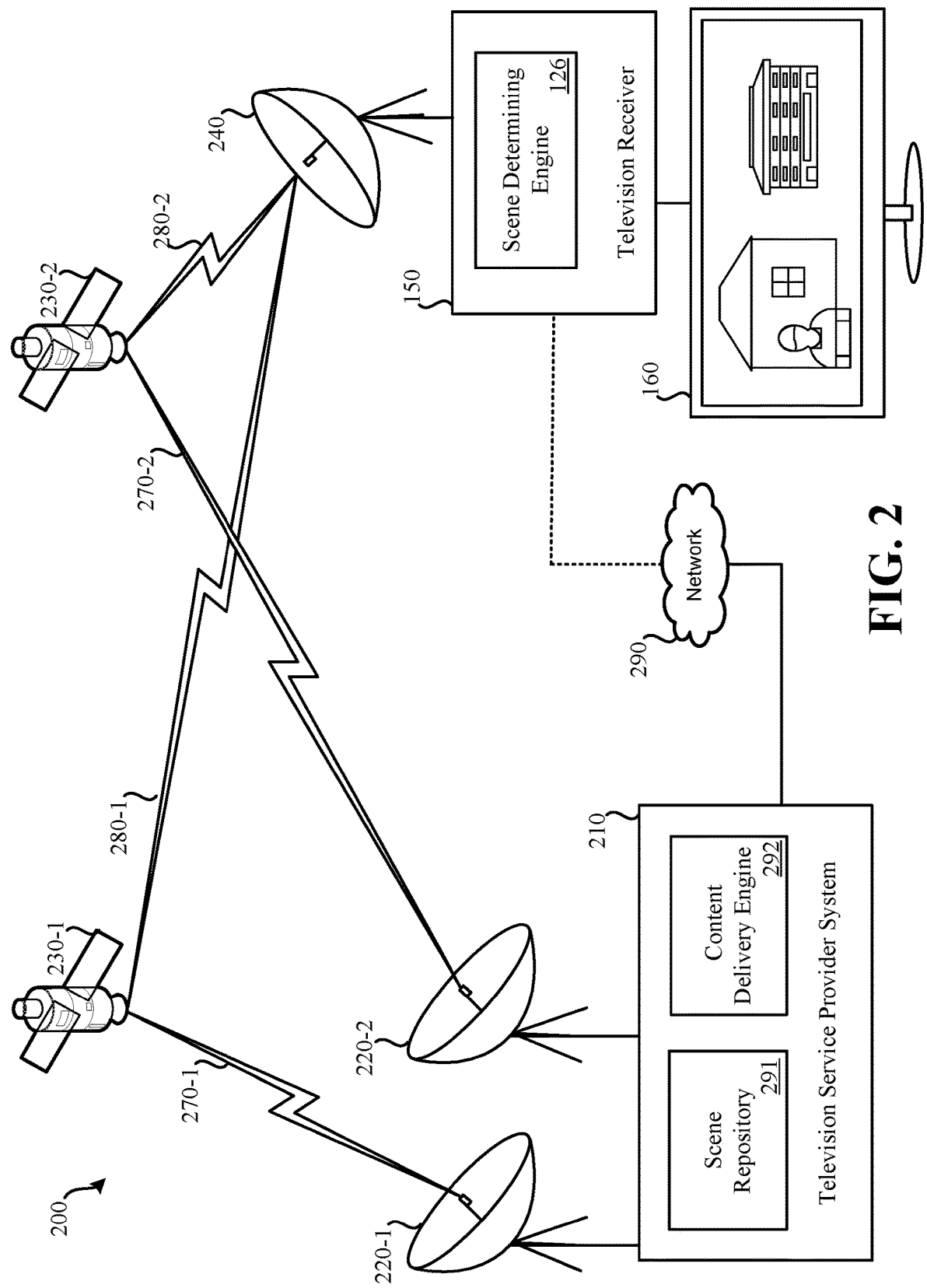
FIG. 2 illustrates an embodiment of a satellite television distribution system.

Turning to FIG. 2, there is depicted a television receiver for a satellite based television system. Satellite television distribution system 200 may include: television service provider system 210, satellite transmitter equipment 220, satellites 230, satellite dish 240, television receiver 150, and display device, such as a television. Alternate examples of satellite television distribution system 200 may include fewer or greater numbers of components. While only one satellite dish 240, television receiver 150, and display device 160 (collectively referred to as "user equipment") are illustrated, it should be understood that multiple (e.g., tens, thousands, millions) instances of user equipment may receive television signals from television service provider system 210 via satellites 230.

Television service provider system 210 and satellite transmitter equipment 220 may be operated by a television service provider. A television service provider may distribute television channels, on-demand programming, programming information, marketing content, and/or other content/services to users. In some examples the television service provider system 210 may distribute or provide a gateway or library of item databases for item detection.

Television service provider system 210 may receive feeds of one or more television channels from various sources. Such television channels may include multiple television channels that contain at least some of the same content (e.g., network affiliates). To distribute television channels and marketing content for presentation to users, feeds of the television channels may be relayed to user equipment via multiple television distribution satellites. Each satellite may relay multiple transponder streams. Satellite transmitter equipment 220 (220-1, 220-2) may be used to transmit a feed of one or more television channels from television service provider system 210 to one or more satellites 230. While a television service provider system 210 and satellite transmitter equipment 220 are illustrated as part of satellite television distribution system 200, it should be understood that multiple instances of transmitter equipment may be used, possibly scattered geographically, to communicate with satellites 230. Such multiple instances of satellite transmitting equipment may communicate with the same or with different satellites. Different television channels may be transmitted to satellites 230 from different instances of transmitting equipment. For instance, a different satellite dish of satellite transmitter equipment 220 may be used for communication with satellites in different orbital slots.

Satellites 230 may be configured to receive signals, such as streams of television channels or marketing content, from one or more satellite uplinks, such as satellite transmitter equipment 220. Satellites 230 may relay received signals from satellite transmitter equipment 220 (and/or other satellite transmitter equipment) to multiple instances of user equipment via transponder streams. Different frequencies may be used for uplink signals 270 from transponder streams 280. Satellites 230 may be in geosynchronous orbit. Each of the transponder streams transmitted by satellites 230 may contain multiple television channels and/or configuration data transmitted as packetized data. For example, a single transponder stream may be a serial digital packet stream containing multiple television channels. Therefore, packets for multiple television channels may be interspersed. In examples a stream of a television channel may be referred to as a programming stream. In some cases several television channels may be combined into one stream, such as in a transponder stream. In this descriptions transponder streams and programming streams may be used synonymously.

Multiple satellites may be used to relay television channels from television service provider system 210 to satellite dish 240. Different television channels and marketing content may be carried using different satellites. Different television channels and/or configuration data may also be carried using different transponders of the same satellite. As an example, a first and second television channel may be relayed via a first transponder of satellite 230-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Each transponder stream may be able to carry a finite amount of data. As such, the number of television channels that can be included in a particular transponder stream may be at least partially dependent on the resolution of the video of the television channel. For example, a transponder stream may be able to carry seven or eight television channels at a high resolution, but may be able to carry dozens, fifty, a hundred, two hundred, or some other number of television channels at reduced resolutions.

Satellite dish 240 may be a piece of user equipment that is used to receive transponder streams from one or more satellites, such as satellites 230. Satellite dish 240 may be provided to a subscriber for use on a subscription basis to receive television channels provided by the television service provider system 210, satellite transmitter equipment 220, and/or satellites 230. Satellite dish 240, which may include one or more low noise blocks (LNBs), may be configured to receive transponder streams from multiple satellites and/or multiple transponders of the same satellite. Satellite dish 240 may be configured to receive television channels via transponder streams on multiple frequencies. Based on the characteristics of television receiver 150 and/or satellite dish 240, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time.

In communication with satellite dish 240 may be one or more television receivers. Television receivers may be configured to decode signals received from satellites 230 via satellite dish 240 for output and presentation via a display device, such as a television. A television receiver may be incorporated as part of a television or may be part of a separate device, commonly referred to as a set-top box (STB).

Display device 160 may be used to present video and/or audio decoded and output by television receiver 150. Television receiver 150 may also output a display of one or more interfaces to display device 160, such as an electronic programming guide (EPG). The television receiver 150 may output to a display device 160 one or more interfaces for monitoring, configuring, or controlling monitoring and control applications. In many examples, display device 160 is a television. Display device 160 may also be a monitor, computer, or some other device configured to display video and, possibly, play audio.

Uplink signal 270-1 represents a signal between satellite transmitter equipment 220 and satellite 230-1. Uplink signal 270-2 represents a signal between satellite transmitter equipment 220 and satellite 230-2. Each of uplink signals 270 may contain streams of one or more different television channels. For example, uplink signal 270-1 may contain a first group of television channels, while uplink signal 270-2 contains a second group of television channels. Each of these television channels may be scrambled such that unauthorized persons are prevented from accessing the television channels.

Transponder stream 280-1 represents a transponder stream signal between satellite 230-1 and satellite dish 240. Transponder stream 280-2 represents a transponder stream signal between satellite 230-2 and satellite dish 240. Each of transponder streams 280 may contain one or more different television channels and/or information related to configuration data, which may be at least partially scrambled. For example, transponder stream 280-1 may be a first transponder stream containing a first group of television channels, while transponder stream 280-2 may be a second transponder stream containing a different group of television channels. Television channel or marketing content received as part of a transponder stream may be presented to the user or stored in a storage medium as part of DVR functionality for later retrieval.

Network 290 may serve as a secondary communication channel between television service provider system 210 and television receiver 150. Via such a secondary communication channel, bidirectional exchange of data may occur. Data may be transmitted to the television service provider system 210 from television receiver 150 via network 290. Data may also be transmitted from television service provider system 210 to television receiver 150 via network 290. Network 290 may be the Internet. For instance, the network 290 may be used to transfer information (e.g., from the television receiver 150 to the television service provider system 210) indicative of a scene determined by the scene determining engine 126 included in the television receiver 150.

The television service provider system 210 may maintain a history of detected scenes in a scene repository 291. Each scene may be associated with one or more content items that are relevant to the scene. For instance, for an 'exercising' scene or a fitness scene, the one or more content items may include a protein drink, exercise gear, such as clothing. The list of scenes stored in the scene repository 291 may be analyzed by a content delivery engine 292 included in the television service provider system 210. In one implementation, upon receiving information regarding a current scene determined by the scene determining engine 126, the content delivery engine 292 analyzes the stored scenes in the scene repository to identify one or more identical or similar scenes.

The content delivery engine 292 thereafter retrieves the list of content items associated with the one or more identical or similar scenes. The content delivery engine 292 may select one content item to be transmitted to the television receiver. Such a selection may be based on a score associated with each content item, where the score is indicative of a relevancy of the content item to the scene. It is noted that the score of the content item may be updated by the television service provider system 210 based on content effectiveness information received from the television receiver 150. In some instances, the content item delivered to the television receiver may be selected based on at least some entities included in the captured one or more images. For example, if the scene determined by the scene determining engine 126 is a 'dining' scene, and the image includes one or more children, then the content delivery engine may select a content item that is appropriate for viewing by children.

According to some embodiments, the content item to be delivered to the television receiver is an advertisement. The television service provider system 210 may directly provide advertisements to the television receiver 150 according to the determination made by the content delivery engine 292. In some cases, various content types may be always streamed or sent by the television service provider system 210 over the satellites to the television receiver 150. The television service provider system 210, based on the determination from the content delivery engine 292, may transmit to the television receiver 150 an indication as to which content to display to the user. The indication may be sent via the network 290. Furthermore, the television service provider system 210 may instruct the television receiver 150 to output the content item (e.g., advertisement) to the television, in a free time-slot (e.g., next time slot) that succeeds the current programming content being displayed at the television.

Figure 3:
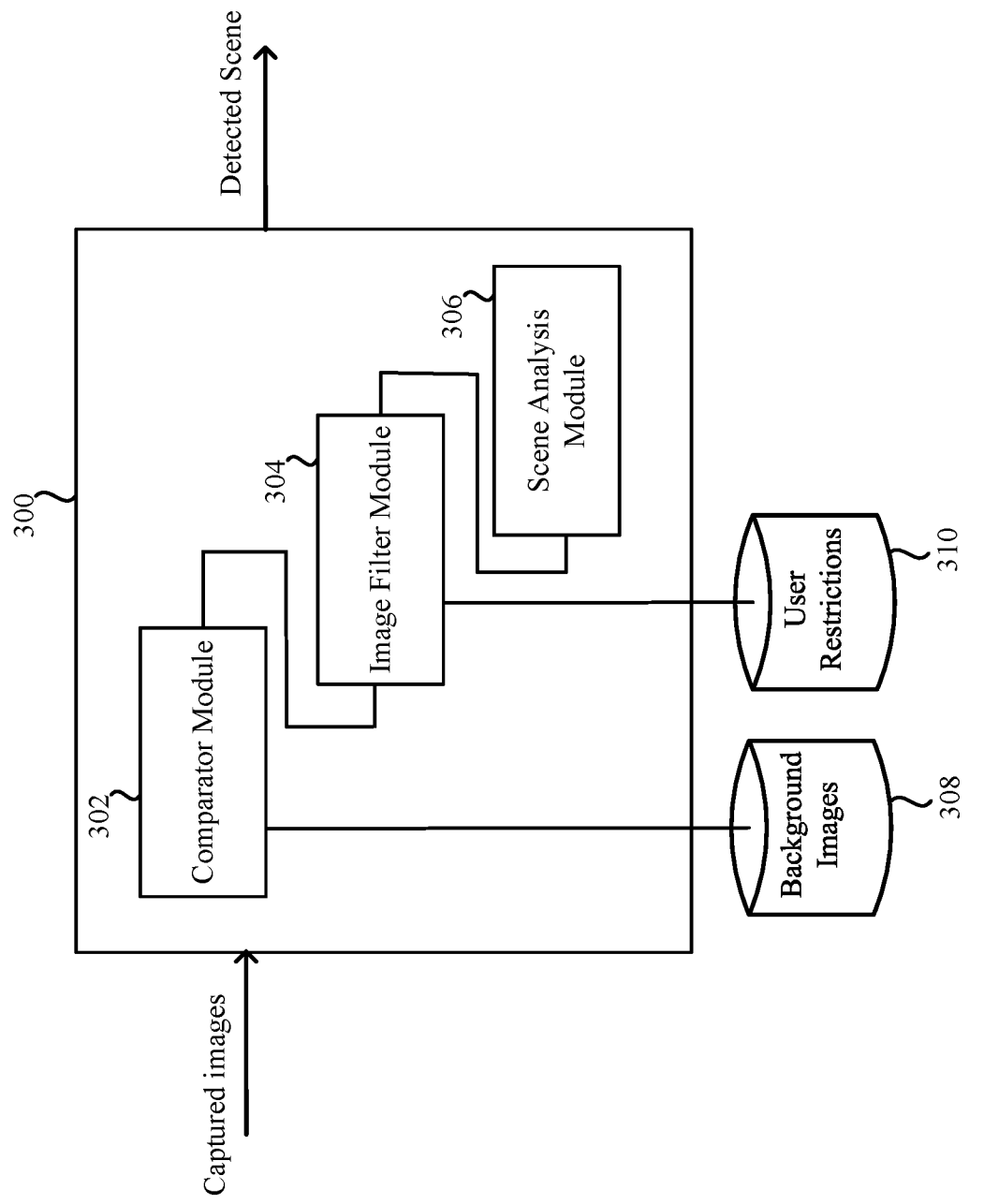
FIG. 3 illustrates an embodiment of a scene determining engine.

FIG. 3 shows an example embodiment of a scene determining engine 300 configured for determining a scene associated with one or more images. The scene determining engine 300 may receive captured images from the imaging devices (e.g., imaging devices 140, 141 of FIG. 1). The scene determining engine 300 may receive data from one or more databases (e.g., background images database 108 and user restrictions database 310). These databases may include data related to background images and user restrictions, respectively. The scene determining engine 300 may process received captured images using the comparator module 302, the image filter module 304, and the scene analysis module 306.

The comparator module 302 may be configured to receive captured images and determine if the captured images have changed since last capture or compared to baseline background images. The comparator may compare, take the difference, or perform other operations between captured images and one or more background images from the background images database 308. The comparator module 302 may determine if the at least 15% or at least 2% of the captured image differs from the background images. If at least 2% differs the comparator module 302 may identify the areas of the captured image that differ and pass the processing of the image on to the image filter module 304.

The image filter module 304 may receive data from the user restriction database 310 to determine if any of the areas identified by the comparator module 302 may be restricted from analysis by the user. The image filter module 304 may filter areas of the image determined to be restricted by the user. The image filter module 304 may filter areas of the image based on the coordinates of the image. User restrictions may, for example, include restrictions that specify that the lower right corner of the captured image should not be analyzed for items. The area of the image may be further filtered by the image filter module 304 to prevent processing. If, after filtering, the captured image still contains at least 2% of an area that differs from the background images, the captured image may be processed by the scene analysis module 306.

The scene analysis module 306 may include a trained machine-learning model (e.g., neural network model), that performs a classification, which indicates a scene associated with the captured image(s). It is appreciated that the scene determination may be performed based on one or more entities detected in the one or more images, an activity performed by one or more entities in an area of the user premises (e.g., field of view of the imaging devices), or both. The scene analysis module may associate a tag (e.g., a label) which corresponds to the scene associated with the captured images. Further, by some embodiments, the scene determining engine 300 may implement certain mechanisms to provide privacy to a user of the television receiver 150. For instance, the scene determining engine 300 may include a timer that disables the scene analysis module 306 at certain preset times by a user, disables the scene analysis module 306 in response to a television (that is communicatively coupled to the television receiver) being turned off, etc. The scene determining engine 300 determines a scene associated with the captured image(s), and transmits information indicative of the determined scene to the service provider system in order to obtain one or more content items that are relevant to the determined scene.

Figure 4:
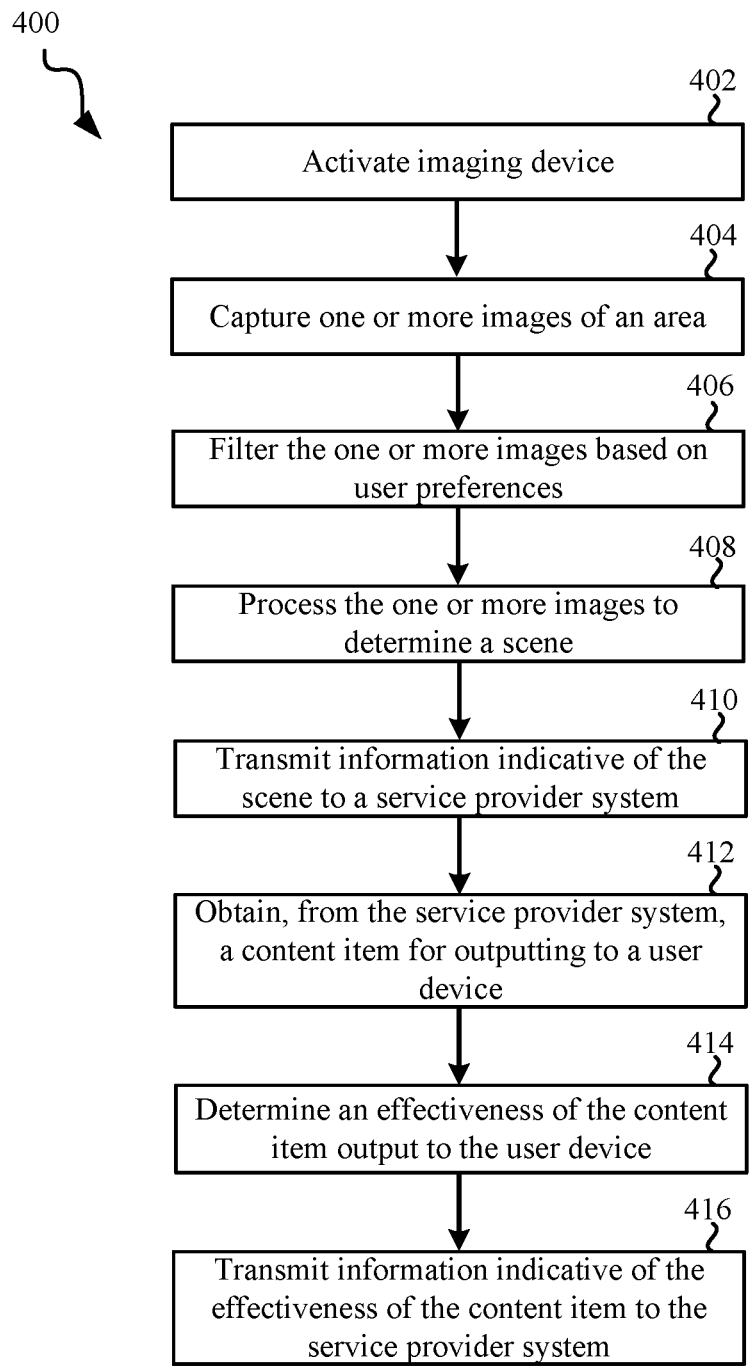
FIG. 4 illustrates an embodiment of a method for targeting content to be output by a television receiver.

FIG. 4 illustrates an embodiment of a method for targeting content to be output by a television receiver. Method 400 may be performed using the systems previously described. For instance, television receiver 150 included in system 100 of FIG. 1 may perform the method depicted in FIG. 4. Components of such systems may be implemented using hardware, software, and/or firmware. Further, the performance of method 400 may include one or more instances of components of a computer system.

At block 402 one or more imaging devices (e.g., imaging devices 140 and 141 of FIG. 1) may be activated and used to image an area (e.g., a user premises in block 404). At block 406, the one or more images captured by the imaging devices are filtered based on user preferences. For instance, as stated previously, certain areas of the captured images may be filtered (e.g., cut out) based on input(s) received from a user.

At block 408, the filtered one or more images are processed to determine a scene associated with the one or more images. For example, the scene determining engine 126 included in the television receiver may process the filtered images to output a scene associated with the captured images. The scene determining engine 126 may for instance associate a tag (label) with the captured images, where the label is indicative of the scene associated with the captured images. At block 410, the information indicative of the scene (e.g., the label), the one or more entities captured in the image(s), etc., may be transmitted to a service provider system.

At block 412, the television receiver obtains a content item from the service provider system. It is appreciated that the obtained content item is outputted, for presentation, by the television receiver to a user device (e.g., a television, a display panel). At block 414, the television receiver may determine an effectiveness of the content item that was provided to the user device. For example, the content effectiveness module 128 included in the television receiver 150 may determine the effectiveness of the content item as described previously. At block 416, information indicative of the determined effectiveness of the content item is transmitted by the television receiver to the service provider system. It is appreciated that the service provider system may utilize such information (e.g., effectiveness information) to update a score indicative of a relevancy of the content item to the scene. Upon transmitting information indicative of the effectiveness of the content item, the method depicted in FIG. 4 terminates.

Figure 5:
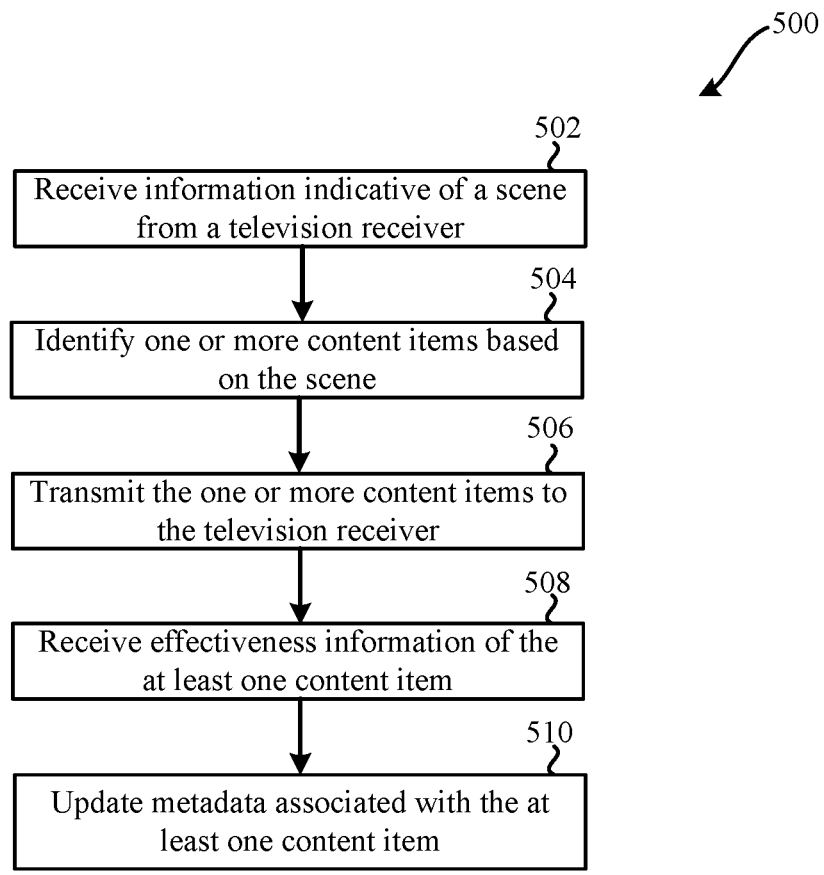
FIG. 5 illustrates an embodiment of a method performed by a service provider system for determining a content item to be delivered to a television receiver.

FIG. 5 illustrates an embodiment of a method performed by a service provider system for determining a content item to be delivered to a television receiver. Method 500 may be performed using the systems previously described. For instance, the television service provider system 210 of FIG. 2 may perform the method depicted in FIG. 5. Components of such systems may be implemented using hardware, software, and/or firmware. Further, the performance of method 500 may include one or more instances of components of a computer system.

At block 502, the service provider system receives from the television receiver, information indicative of a scene. For instance, the service provider system may receive a tag or a label corresponding to a scene associated with a captured image. At block 504, the service provider system identifies one or more content items based on the scene. For instance, the content delivery engine 292 of FIG. 2 that is included in the service provider system may access the scene repository 291 to identify one or more content items based on the scene.

At block 506, the one or more content items are transmitted by the service provider system to the television receiver. It is appreciated that the content item may correspond to an advertisement that is to be output by the television receiver, for presentation purposes to a user device (e.g., a television). Thereafter, at block 508, the service provider system may receive information, from the television receiver, pertaining to an effectiveness of the content item output to the user device. The effectiveness of a content item corresponds to how useful (or of interest) is the content item to a user. It is appreciated that the effectiveness of the content item may be determined via detecting click or touch operations performed with respect to the content item as described previously. Thereafter, at block 510, metadata associated with the content item (e.g., an effectiveness score of the content item) may be updated/modified based on the received effectiveness information of block 508.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium, such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for targeting content for output by a television receiver, the method comprising:
    activating, by the television receiver, an imaging device disposed in a user premises, the activating comprising directing the imaging device to capture one or more images of an area of the user premises;
    processing, by the television receiver, the one or more images to determine a scene associated with the user premises, wherein the scene is an activity performed in the user premises;
    transmitting, by the television receiver, information indicative of the scene to a service provider system;
    receiving, by the television receiver, a content item from the service provider system, the content item being determined based on an effectiveness score associated with the content item and the scene, wherein the effectiveness score is indicative of a relevancy of the content item to the information indicative of the scene; and
    outputting, by the television receiver, the content item for presentation to a user device.

2. The method of claim 1, wherein a machine-learning model executed by the television receiver performs a classification that indicates the scene based on one or more entities detected in the one or more images, an activity performed by one or more entities in the area of the user premises, or both.

3. The method of claim 1, further comprising:
    filtering, by the television receiver, the one or more images captured by the imaging device based on a set of user preferences, wherein the set of user preferences direct the filtering of the one or more images to be performed based on: a field of view of the imaging device, a portion of the area defined as off-limits for the imaging device, and/or specified times.

4. The method of claim 2, wherein the machine-learning model is a neural network.

5. The method of claim 1, wherein the content item is an advertisement and the user device is a television that is communicatively coupled with the television receiver, the advertisement being delivered in a time-slot that immediately succeeds a programming content being displayed on the television.

6. The method of claim 1, wherein the content item received by the television receiver is further determined based on one or more entities detected in the one or more images captured by the imaging device.

7. The method of claim 1, further comprising:
    sending, by the television receiver, a message including the information indicative of the scene to the service provider system, wherein the service provider system accesses a repository storing a plurality of content items to identify the content item to be delivered to the television receiver.

8. The method of claim 1, further comprising:
    sending, by the service provider system, the content item to the television receiver, wherein the service provider system identifies the content item based on a metadata associated with the content item, wherein the metadata comprises the effectiveness score.

9. A television receiver for outputting content, the television receiver comprising:
    a processor; and
    a memory including instructions that, when executed by the processor, cause the television receiver to perform operations comprising:
        activating an imaging device disposed in a user premises, the activating comprising directing the imaging device to capture one or more images of an area of the user premises;
        processing the one or more images to determine a scene associated with the user premises, wherein the scene is an activity performed in the user premises;
        transmitting information indicative of the scene to a service provider system;
        receiving a content item from the service provider system, the content item being determined based on an effectiveness score associated with the content item and the scene, wherein the effectiveness score is indicative of a relevancy of the content item to information indicative of the scene; and
        outputting the content item for presentation to a user device.

10. The television receiver of claim 9, wherein a machine-learning model executed by the television receiver performs a classification that indicates the scene based on one or more entities detected in the one or more images, an activity performed by one or more entities in the area of the user premises, or both.

11. The television receiver of claim 9, wherein the television receiver is further configured for:
    filtering the one or more images captured by the imaging device based on a set of user preferences, wherein the set of user preferences direct the filtering of the one or more images to be performed based on: a field of view of the imaging device, a portion of the area defined as off-limits for the imaging device, and/or specified times.

12. The television receiver of claim 10, wherein the machine-learning model is a neural network.

13. The television receiver of claim 9, wherein the content item is an advertisement and the user device is a television that is communicatively coupled with the television receiver, the advertisement being delivered in a time-slot that immediately succeeds a programming content being displayed on the television.

14. The television receiver of claim 9, wherein the content item received by the television receiver is further determined based on one or more entities detected in the one or more images captured by the imaging device.

15. The television receiver of claim 9, wherein the television receiver is further configured for:
    sending a message including information indicative of the scene to the service provider system, wherein the service provider system accesses a repository storing a plurality of content items to identify the content item to be delivered to the television receiver.

16. One or more non-transitory, machine-readable media having machine-readable instructions thereon which, when executed by a television receiver, causes the television receiver to perform operations comprising:
  activating, by the television receiver, an imaging device disposed in a user premises, the activating comprising directing the imaging device to capture one or more images of an area of the user premises;
  processing, by the television receiver, the one or more images to determine a scene associated with the user premises, wherein the scene is an activity performed in the user premises;
  transmitting, by the television receiver, information indicative of the scene to a service provider system;
  receiving, by the television receiver, a content item from the service provider system, the content item being determined based on an effectiveness score associated with the content item and the scene, wherein the effectiveness score is indicative of a relevancy of the content item to the information indicative of the scene; and
  outputting, by the television receiver, the content item for presentation to a user device.

17. The one or more non-transitory, machine-readable media as recited in claim 16, wherein a machine-learning model executed by the television receiver performs a classification that indicates the scene based on one or more entities detected in the one or more images, an activity performed by one or more entities in the area of the user premises, or both.

18. The one or more non-transitory, machine-readable media as recited in claim 16, wherein the content item is an advertisement and the user device is a television that is communicatively coupled with the television receiver, the advertisement being delivered in a time-slot that immediately succeeds a programming content being displayed on the television.

19. The one or more non-transitory, machine-readable media as recited in claim 16, wherein the content item received by the television receiver is further determined based on one or more entities detected in the one or more images captured by the imaging device.

20. The one or more non-transitory, machine-readable media as recited in claim 16, wherein the television receiver is further configured for:
  sending a message including the information indicative of the scene to the service provider system, wherein the service provider system accesses a repository storing a plurality of content items to identify the content item to be delivered to the television receiver.

* * * * *